United States Patent
Junger et al.

(10) Patent No.: US 8,712,856 B2
(45) Date of Patent: Apr. 29, 2014

(54) SYSTEMS AND/OR METHODS FOR DETERMINING ITEM SERIAL NUMBER STRUCTURE AND INTELLIGENCE

(75) Inventors: Peter J Junger, Redmond, WA (US); Jeremy Prellwitz, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 258 days.

(21) Appl. No.: 13/084,882

(22) Filed: Apr. 12, 2011

(65) Prior Publication Data

US 2011/0251911 A1 Oct. 13, 2011

Related U.S. Application Data

(60) Provisional application No. 61/282,857, filed on Apr. 12, 2010.

(51) Int. Cl.
*G06Q 20/00* (2012.01)
(52) U.S. Cl.
USPC ............... 705/23; 705/50; 705/51; 705/55; 705/56; 705/61
(58) Field of Classification Search
None
See application file for complete search history.

(56) References Cited

U.S. PATENT DOCUMENTS

| | | | |
|---|---|---|---|
| 789,106 | A | 5/1905 | Seymour |
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |
| 4,734,005 | A | 3/1988 | Blumberg |
| 4,750,119 | A | 6/1988 | Cohen et al. |
| 4,789,054 | A | 12/1988 | Shore et al. |

(Continued)

FOREIGN PATENT DOCUMENTS

| | | |
|---|---|---|
| BR | PI 9813567-8 | 10/2000 |
| BR | 0101819-1 | 2/2003 |

(Continued)

OTHER PUBLICATIONS

1992 Nintendo Product Returns Policy.

(Continued)

*Primary Examiner* — Fateh Obaid
(74) *Attorney, Agent, or Firm* — Nixon & Vanderhye P.C.

(57) ABSTRACT

Certain exemplary embodiments relate to techniques for determining the correct item serial number structure, even when information regarding the serial number data and/or structure is lacking. Such techniques advantageously promote data integrity by helping to ensure that the desired data is captured correctly, while also reducing (and sometimes even eliminating) the need to obtain detailed information regarding serial number structure and intelligence that sometimes is guarded by producers/manufacturers. Statistical sampling of collected unknown data formats may be used to help decipher product identification numbers (or other numbers) such as product serial numbers through a repetitive process of scanning a known constant such as the UPC number, followed by a variable number such as a products serial number. Certain exemplary embodiments check serial number against a database containing algorithms to determine if and which algorithm is used to create such serial numbers.

20 Claims, 3 Drawing Sheets

(56) References Cited

U.S. PATENT DOCUMENTS

| | | | |
|---|---|---|---|
| 4,792,018 A | 12/1988 | Humble et al. | |
| 4,803,348 A | 2/1989 | Lohrey et al. | |
| 4,812,629 A | 3/1989 | O'Neil et al. | |
| 4,814,592 A | 3/1989 | Bradt et al. | |
| 4,839,505 A | 6/1989 | Bradt et al. | |
| 4,858,743 A | 8/1989 | Paraskevakos et al. | |
| 4,866,661 A | 9/1989 | De Prins | |
| 4,871,054 A | 10/1989 | Murray | |
| 4,884,212 A | 11/1989 | Stutsman | |
| 4,893,705 A | 1/1990 | Brown | |
| 4,896,024 A | 1/1990 | Morello et al. | |
| 4,903,815 A | 2/1990 | Hirschfeld et al. | |
| 4,967,906 A | 11/1990 | Morello et al. | |
| 4,984,155 A | 1/1991 | Geier et al. | |
| 4,997,076 A | 3/1991 | Hirschfeld et al. | |
| 5,007,518 A | 4/1991 | Crooks et al. | |
| 5,020,958 A | 6/1991 | Tuttobene | |
| 5,028,766 A | 7/1991 | Shah | |
| 5,042,686 A | 8/1991 | Stucki | |
| 5,128,520 A | 7/1992 | Rando et al. | |
| 5,128,527 A | 7/1992 | Kawai et al. | |
| 5,133,441 A | 7/1992 | Brown | |
| 5,139,384 A | 8/1992 | Tuttobene | |
| 5,143,193 A | 9/1992 | Geraci | |
| 5,159,560 A | 10/1992 | Newell et al. | |
| 5,216,612 A | 6/1993 | Cornett et al. | |
| 5,231,569 A | 7/1993 | Myatt et al. | |
| 5,256,863 A | 10/1993 | Ferguson et al. | |
| 5,257,741 A | 11/1993 | Rode et al. | |
| 5,273,183 A | 12/1993 | Tuttobene | |
| 5,311,424 A | 5/1994 | Mukherjee et al. | |
| 5,367,148 A | 11/1994 | Storch et al. | |
| 5,414,252 A | 5/1995 | Shinoda et al. | |
| 5,478,990 A | 12/1995 | Montanari et al. | |
| 5,520,990 A | 5/1996 | Rotermund | |
| 5,521,815 A | 5/1996 | Rose, Jr. | |
| 5,537,314 A | 7/1996 | Kanter | |
| 5,541,394 A | 7/1996 | Kouchi et al. | |
| 5,581,064 A | 12/1996 | Riley et al. | |
| 5,602,377 A | 2/1997 | Beller et al. | |
| 5,671,279 A | 9/1997 | Elgamal | |
| 5,712,989 A | 1/1998 | Johnson et al. | |
| 5,721,832 A | 2/1998 | Westrope et al. | |
| 5,737,726 A | 4/1998 | Cameron et al. | |
| 5,745,036 A | 4/1998 | Clare | |
| 5,799,285 A | 8/1998 | Klingman | |
| 5,804,803 A | 9/1998 | Cragun et al. | |
| 5,857,175 A | 1/1999 | Day et al. | |
| 5,890,138 A | 3/1999 | Goidin | |
| 5,895,453 A | 4/1999 | Cook | |
| 5,913,210 A | 6/1999 | Call | |
| 5,918,214 A | 6/1999 | Perkowski | |
| 5,950,173 A | 9/1999 | Perkowski | |
| 5,968,110 A | 10/1999 | Westrope et al. | |
| 5,984,508 A | 11/1999 | Hurley | |
| 6,014,635 A | 1/2000 | Harris et al. | |
| 6,016,480 A | 1/2000 | Houvener et al. | |
| 6,029,139 A | 2/2000 | Cunningham et al. | |
| 6,029,141 A | 2/2000 | Bezos et al. | |
| 6,039,244 A | 3/2000 | Finstrewald | |
| 6,049,778 A | 4/2000 | Walker et al. | |
| 6,055,511 A | 4/2000 | Luebbering et al. | |
| 6,064,979 A | 5/2000 | Perkowski | |
| 6,085,167 A | 7/2000 | Iguchi | |
| 6,105,001 A | 8/2000 | Masi et al. | |
| 6,115,690 A | 9/2000 | Wong | |
| 6,119,099 A | 9/2000 | Walker et al. | |
| 6,119,164 A | 9/2000 | Basche | |
| 6,125,352 A | 9/2000 | Franklin et al. | |
| 6,134,533 A | 10/2000 | Shell | |
| 6,148,249 A | 11/2000 | Newman | |
| 6,154,738 A | 11/2000 | Call | |
| 6,219,652 B1 | 4/2001 | Carter et al. | |
| 6,222,914 B1 | 4/2001 | McMullin | |
| 6,536,659 B1 | 3/2003 | Hauser | |
| 6,550,685 B1 | 4/2003 | Kindberg | |
| 6,606,608 B1 | 8/2003 | Bezos | |
| 6,721,332 B1* | 4/2004 | McAlear | 370/466 |
| 6,746,053 B1 | 6/2004 | Afzali-Ardakani et al. | |
| 6,834,268 B2 | 12/2004 | Junger | |
| 6,933,848 B1 | 8/2005 | Stewart et al. | |
| 6,947,941 B1* | 9/2005 | Koon | 707/697 |
| 6,965,866 B2 | 11/2005 | Klein | |
| 6,974,941 B2 | 12/2005 | Kuo | |
| 7,000,834 B2 | 2/2006 | Hind et al. | |
| 7,117,227 B2 | 10/2006 | Call | |
| 7,118,478 B2 | 10/2006 | Fayter et al. | |
| 7,143,055 B1 | 11/2006 | Perkowski | |
| 7,162,440 B2 | 1/2007 | Koons | |
| 7,254,124 B2* | 8/2007 | Refai | 370/342 |
| 7,376,572 B2 | 5/2008 | Siegel | |
| 7,379,899 B1 | 5/2008 | Junger | |
| 7,415,617 B2 | 8/2008 | Ginter et al. | |
| 7,455,230 B2 | 11/2008 | Junger et al. | |
| 7,580,860 B2 | 8/2009 | Junger | |
| 7,693,731 B1 | 4/2010 | Weber et al. | |
| 7,729,923 B2 | 6/2010 | O'Connor | |
| 7,797,164 B2 | 9/2010 | Junger et al. | |
| 7,840,439 B2 | 11/2010 | O'Connor | |
| 7,850,081 B2 | 12/2010 | Swan et al. | |
| 7,890,373 B2 | 2/2011 | Junger | |
| 8,244,644 B2* | 8/2012 | Knipfer et al. | 705/303 |
| 8,260,984 B2* | 9/2012 | Iima | 710/61 |
| 2002/0032612 A1 | 3/2002 | Williams et al. | |
| 2002/0116274 A1 | 8/2002 | Hind et al. | |
| 2002/0133425 A1 | 9/2002 | Pederson et al. | |
| 2002/0143671 A1 | 10/2002 | Afzali-Ardakani et al. | |
| 2003/0050891 A1 | 3/2003 | Cohen | |
| 2003/0094494 A1 | 5/2003 | Blanford et al. | |
| 2003/0126034 A1 | 7/2003 | Cheney et al. | |
| 2003/0141358 A1 | 7/2003 | Hudson et al. | |
| 2004/0006514 A1 | 1/2004 | Rogers | |
| 2004/0037250 A1* | 2/2004 | Refai | 370/335 |
| 2004/0054900 A1 | 3/2004 | He | |
| 2004/0153344 A1 | 8/2004 | Bui et al. | |
| 2004/0172260 A1 | 9/2004 | Junger et al. | |
| 2004/0195341 A1 | 10/2004 | Lapstun et al. | |
| 2004/0199760 A1* | 10/2004 | Mazza et al. | 713/150 |
| 2005/0097054 A1 | 5/2005 | Dillon | |
| 2005/0100144 A1 | 5/2005 | O'Connor | |
| 2005/0137882 A1 | 6/2005 | Cameron et al. | |
| 2006/0175401 A1 | 8/2006 | Roberts | |
| 2007/0100761 A1 | 5/2007 | Dillon | |
| 2007/0185788 A1 | 8/2007 | Dillon | |
| 2008/0008348 A1 | 1/2008 | Metois et al. | |
| 2008/0052184 A1 | 2/2008 | Junger et al. | |
| 2008/0059226 A1 | 3/2008 | Melker | |
| 2008/0089686 A1* | 4/2008 | Kazawa et al. | 398/71 |
| 2008/0188974 A1* | 8/2008 | Knipfer et al. | 700/110 |
| 2008/0262948 A1 | 10/2008 | Grady et al. | |
| 2008/0317469 A1* | 12/2008 | Kazawa et al. | 398/71 |
| 2009/0150170 A1 | 6/2009 | Junger et al. | |
| 2009/0281935 A1 | 11/2009 | Junger | |
| 2010/0185533 A1 | 7/2010 | O'Connor | |
| 2010/0235290 A1 | 9/2010 | Junger et al. | |
| 2010/0257486 A1 | 10/2010 | Smith | |
| 2010/0325020 A1 | 12/2010 | Junger et al. | |
| 2011/0016008 A1 | 1/2011 | Maraz et al. | |
| 2011/0029397 A1 | 2/2011 | Junger | |
| 2011/0066514 A1 | 3/2011 | Maraz | |
| 2011/0251911 A1* | 10/2011 | Junger et al. | 705/23 |
| 2012/0313754 A1* | 12/2012 | Bona | 340/5.82 |

FOREIGN PATENT DOCUMENTS

| | | |
|---|---|---|
| BR | PI 0503016-1 | 10/2005 |
| BR | PI 0505846-5 | 9/2007 |
| CA | 2374623 | 4/2001 |
| CA | 2404814 | 10/2001 |
| CA | 2408553 | 11/2001 |
| CN | 1177408 | 3/1998 |
| CN | 1289972 | 4/2001 |
| CN | 101068731 | 11/2007 |
| CN | 101089871 | 12/2007 |

(56) References Cited

FOREIGN PATENT DOCUMENTS

| | | |
|---|---|---|
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1 028 386 | 8/2000 |
| EP | 1 841 195 | 11/2000 |
| EP | 1 195 704 | 4/2002 |
| EP | 1 246 109 | 10/2002 |
| EP | 1 571 541 | 3/2005 |
| EP | 1 667 018 | 10/2005 |
| EP | 2 036 015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHEN/2003 | 7/2005 |
| IN | 1763/CHEN/2003 | 3/2007 |
| IN | 2137/CHEN/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 2-139698 | 5/1990 |
| JP | 04-347793 | 12/1992 |
| JP | 05-178422 | 7/1993 |
| JP | 05-342482 | 12/1993 |
| JP | 08-124033 | 5/1996 |
| JP | 10-188141 | 7/1998 |
| JP | 10-340301 | 12/1998 |
| JP | 11-066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| SV | 1991000023 | 1/1991 |
| SV | 2000000045 | 1/1996 |
| SV | 20000000145 | 1/1998 |
| SV | 1996000019 | 1/2000 |
| SV | 1998000129 | 1/2000 |
| SV | 2003001513 | 1/2003 |
| SV | 2003001514 | 1/2003 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

1994 Nintendo Product Returns Policies and Procedures.
1995 Nintendo Product Returns Policies and Procedures.
1996 Nintendo Product Returns Policies and Procedures.
Jan. 6, 2005 Blog (Message 4 of 17) about Schuman article "Bar-Code Scam at Wal-Mart: A Matter of Priorities".
Jan. 13, 2005 Blog (Message 14 of 17) about Schuman article "Bar-Code Scam at Wal-Mart: A Matter of Priorities".
Amazon.com Returns Policy, printed Dec. 14, 2007, 2 pages.
Automatic I.D. News, No more scamming Super Mario, vol. 12, p. 15 (1 pg.), Sep. 1, 1996.
Automotive News, "Reynolds, ADP differ on superhighway progress", Crain Communications, Inc., Apr. 11, 1994, 3 pages.
Birnbaum, Henry, General Information Manual: IBM Circulation Control at Brooklyn College Library, 29pp. (ON 001822-ON 001850).
Brewin et al., "Follow That Package!", Computer World, vol. 35, No. 12, Mar. 19, 2001, 4 pages.
Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
Business Wire, "DataTrend receives award from AT&T Global Information Solutions", Business Wire, Inc., Nov. 7, 1995, 2 pages.
Business Wire, "Multimillion-dollar Health-care Products", Business Wire, Inc., Dec. 15, 1993, 2 pages.
Canadian Search Report for Application No. 2,350,551 dated Jan. 21, 2004.
CollegeTermPapers web page printout, "History of Fed Ex", www.collegetermpaper...rmPapers/Aviation/history_of_fed_ex.html (Aug. 24, 2001), 7 pages.
Collins, David Jarrett and Nancy Nasuti Whipple, Using Bar Code: Why It's Taking Over, Second Edition (ON 003696-ON 004031).
Computer Reseller News, "Case Study; Tapping the Channel's 'Best in Class'", CMP Publications, Inc., Jan. 30, 1995, 2 pages.
Consumer Electronics, Warren Publishing, Inc., Consumer Electronics Personals, vol. 35, No. 6, p. 18.
Cooper, Michael D., Design of Library Automation Systems, pp. 83-109 (ON 1859-ON 001873).
Corbin, John, Developing Computer-Based Library Systems, pp. 144-149 (ON 001874-ON 001877).
DataPhase, Inc. Automated Circulation System, 43 pp. (ON 001878-ON 001904).
Deposition of Peter J. Junger, vol. 1 & 2 (Nov. 8-9, 2001) and Exhibits 1-4 & 8-19.
Deposition of Philip M. Rogers (Nov. 7, 2001) and Exhibits 1-19.
Dilger, "The Other Direction", Manufacturing Systems, vol. 15, No. 10, pp. 12-13 (Oct. 1997).
Direct Return 2000, Software Overview, http://www.directreturn.com/software_overview.htm, Copyright © 2000 Pharmacy Software Solutions, Inc.
Discount Store News, "New Policy System can Par Suspect Returns, Cut Losses", Discount Store News, Lebhar-Friedman Inc., Jan. 1, 1996, 2 pages.
Dowlin, Kenneth E., "MAGGIE III: The Prototypical Library System", Library Hi Tech, Issue 16, vol. 4, No. 4, Winter 1986, pp. 7-15 (ON 001960-ON 001970).
Dranov, Paula, Automated Library Circulation Systems, 1977-1978, pp. 24-47 (ON 001905-ON 001929).
Dreamcom web page printout, www.dreamcomdirect.com/RMA.htm (May 25, 1997).
Drug Topics, Software Maker Promises Many Happy Returns, pp. 124 & 128, Mar. 4, 1996.
Emigh, Jacqueline, "Item-Level RFID Is Years Away for Retailers", eWeek, Jan. 5, 2005.
Federal Express Information Packet, 56 pages (incl. cover and table of contents).
Fox Appliance Return Parts Policy, Aug. 5, 2003, www.foxmacon.com, online, pp. 1-3.
Georgianis, Computer City Moves to Consolidate Returns, Computer Retail Systems, vol. 6, No. 125, Jan. 22, 1998, 2 pages.
Grace, "ABCD Looks to Adopt EDI Transaction Sets", Computer Reseller News, CMP Publications, Inc., Jun. 28, 1993, 2 pages.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.

(56) References Cited

OTHER PUBLICATIONS

Grosch, Audrey N., Distributed Computing and the Electronic Library: Micros to Superminis, pp. 78-79 (ON 002144-ON 002146).
Grotta, "Return to vendor: the right way to make mail-order returns", PC Sources, Information Access Company, a Thomson Corporation Company, ASAP Coastal Associates Publishing L.P., Feb. 1992, 10 pages.
Heller, "High cost of returns prompts industry cooperation," Discount Store News, Oct. 1998, 3 pages.
Hoadley, Irene Braden and A. Robert Thorson, An Automated On-Line Circulation System: Evaluation, Development, Use, 1973, 19 pp. (ON 001930-On 001948).
Hughes Network Systems, LLC, "HughesNet Terms & Conditions", http://www.nationwidesatellite.com/HughesNet/service/HughesNet_terms.asp, available online Sep. 2, 2008.
IBM Systems Journal, vol. 14, No. 1, 1975, pp. 1-101.
Information Disclosure Statement filed in U.S. Appl. No. 08/725,259 on Oct. 5, 1998.
Information Disclosure Statement filed in U.S. Appl. No. 09/065,552 on Jul. 19, 1999.
Information Disclosure Statement filed in U.S. Appl. No. 09/362,187 on Oct. 26, 2001.
Information Disclosure Statement filed in U.S. Appl. No. 09/494,540 on Jan. 31, 2000.
Information Disclosure Statement filed in U.S. Appl. No. 09/509,021 on Oct. 26, 2001.
Information Disclosure Statement filed in U.S. Appl. No. 09/809,072 on Oct. 26, 2001.
Jiji Press Ticker Service, "JCCI Issues Booklet to Explain Distribution", Jiji Press Ltd., Jul. 20, 1989, 1 page.
Jiji Press Ticker Service, "MITI Working Out Business Practice Guidelines", Jiji Press Ltd., Apr. 20, 1990, 1 page.
Joachim, "FedEx Delivers on CEO's IT Vision", InternetWeek, Oct. 25, 1999, 4 pages.
LaPlante, "Rugby Darby; From proprietary host to a distributed LAN-based architecture in 2 years", InfoWorld, InfoWorld Media Group, Nov. 15, 1993, 4 pages.
Leyden, "Burgled mum finds stolen iPod on eBay," The Register, May 17, 2005, 1 page.
Longwell, "Robec Links Its 18 Sales Facilities Via Newly Adopted NetWare System", Computer Reseller News, Sep. 6, 1993.
Longwell, "Western Digital Wins—Price/performance gives driver maker victory margin", Computer Reseller News, CMP Publications, Inc., Jun. 28, 1993, 3 pages.
"Man accused in Lego selling scam," http://www.kptv.com/Global/story.asp?S=4137050&nav=munil56_2, Nov. 18, 2005, 1 page.
Margulis, "Reclaim: an efficient way to handle damaged products", U.S. Distribution Journal, BMT Publications Inc., Mar. 15, 1992, 7 pages.
Matthews, Joseph R., "Graphical User Interfaces GUI in Library Products", Library Technology Reports, vol. 32, No. 1, Jan. 1996, p. 53 (ON 001972-ON 001976).
Meyer, James, "NOTIS: The System and Its Features", Library Hi Tech, Issue 10, vol. 3, No. 2, 1985, pp. 81-89 (ON 001949-ON 001959).
Narda News, "Retailing in Cyberspace", Apr. 1995, pp. 21-22.
Nintendo Point of Purchase Mail-In Card.
PR Newswire, "CompuServe Introduces Electronic Product Registration Software", PR Newswire Association, Inc., Mar. 10, 1994, 2 pages.
PR Newswire, "Escada Offers a Garden Variety for Spring", PR Newswire Association, Inc., Mar. 10, 1994, 2 pages.
Quinn, "Why Wang took the third-party route", Information Access Company, a Thomson Corporation Company, ASAP Reed Publishing USA, vol. 30, No. 2, p. 30, Feb. 1991.
Reynolds, Dennis, Library Automation: Issues and Applications, pp. 42-49 and pp. 146-149 (ON 002147-ON 002153).
Rigney, "User Migrates to Windows NT", InternetWeek, CMP Publications, Inc., Jan. 10, 1994, 2 pages.
Rogers et al., "Going Backwards: Reverse Logistics Trends and Practices", Reverse Logistics Executive Council, 1998 (entire book).
Rosenbloom, "Midnight Express", Inc., Jul. 2001, 4 pages.
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Minicomputers and Mainframes: An Industry Report, part 1", Library Technology Reports, vol. 33, No. 2, Mar. 1997, p. 161 (ON 002088-ON 002096).
Saffady, William, "Vendors of Integrated Library Systems for Microcomputers and Mainframes: An Industry Report, part 2", Library Technology Reports, vol. 33, No. 3, May 1997, p. 277 (ON 002097-ON 002138).
Salmon, Stephen R., Library Automation Systems, p. 239 (ON 002154-ON 002155).
Salton, Gerard, Dynamic Information and Library Processing, pp. 62-69 (ON 002139-ON 002143).
Scala, Betsy Video Business, "Distributors seek 30-day returns", v 13, n 3, p I + Jan. 22, 1993.
Scala, Betsy Video Business, "Distributors seek 30-day returns", v 15, n 39, p I + Oct. 6, 1995.
Schuman, Evan, "Bar-Code Scam at Wal-Mart: A Matter of Priorities", eWeek, Jan. 5, 2005.
Schuman, Evan, "Wal-Mart Stung in $1.5 Million Bar-Code Scam", eWeek, Jan. 5, 2005.
Sigafoos et al., "Absolutely Positively Overnight!: The Unofficial Corporate History of Federal Express", St. Luke Press, 1988, pp. 1-22.
Sleeper, "FedEx Pushes the Right Buttons to Remain No. 1 in Fast Shipping", Investors Business Daily, May 25, 2001, 2 pages.
Synchronics Software Product Information guide, 95 pages.
Synchronics® User Manual: Inventory Plus, Version 6.5, Apr. 1993 (ON 005117-ON 005892).
Synchronics® User Manual: Point of Sale, Version 6.5, Apr. 1993 (ON 004464-ON 005116).
White, Howard S., Library Technology Reports, Mar.-Apr. 1982, vol. 18, No. 2, pp. 178-184 (ON 001851-ON 001858).
Witt et al., "Distribution: a differentiator in 2000", Material Handling Engineering, Penton Publishing Inc., Oct. 1995, 15 pages.
Witt, "How to Master the Art of Returns: Automation Is the Key", Material Handling Engineering, Jun. 1994, pp. 58-60.

* cited by examiner

SYSTEMS AND/OR METHODS FOR DETERMINING ITEM SERIAL NUMBER STRUCTURE AND INTELLIGENCE

CROSS-REFERENCE TO RELATED APPLICATION

This application claims the benefit of U.S. Application Ser. No. 61/282,857, filed on Apr. 12, 2010, the entire contents of which are hereby incorporated by reference herein. This application also incorporates by reference the entire contents of U.S. Pat. Nos. 6,947,941; 6,085,172; 6,018,719; and 5,978,774.

TECHNICAL FIELD

Certain exemplary embodiments disclosed herein relate to techniques for efficiently handling the acquisition of serial number information from products at, for example, a point of sale (POS) system in a retail store. More particularly, certain exemplary embodiments disclosed herein relate to techniques for determining the correct item serial number structure, even when information regarding the serial number data and/or structure is lacking or even non-existent. Advantageously, the techniques of certain exemplary embodiments help ensure that the desired data is captured correctly, thereby promoting data integrity, while also reducing (and sometimes even eliminating) the need to obtain detailed information regarding serial number structure and intelligence that sometimes is guarded by producers/manufacturers.

BACKGROUND AND SUMMARY

Certain exemplary embodiments of this invention relate to the field of product serial numbers and their use in connection with an electronic registration system for such products. More particularly, certain exemplary embodiments provide techniques for efficiently handling the acquisition of serial number information from products at, for example, a point of sale (POS) system in a retail store or the like. In addition, certain exemplary embodiments also enable the correct item serial number structure to be determined. In certain exemplary instances, this determination may be made without the benefit of the producer/manufacturer of such items divulging the serial number data intelligence and/or structure.

Certain exemplary embodiments also are advantageous when used in connection with, for example, an electronic product registration system designed to be used with different products and/or different product manufacturers. Examples of electronic registration (ER) systems in which the instant invention may be used are described in the above-noted patent applications.

These electronic registration systems facilitate compliance with return policies and are useful in reducing improper or fraudulent product returns under warranty, and may also provide related functionality to third parties and the like. Such electronic registration systems also may enable real time or substantially real time data storage and retrieval for the purpose of verifying and validating sales transaction data and product return/warranty repair eligibility. These ER systems also enable efficient handling of product return transactions.

ER systems generally capture product serial number information at the time of product purchase. As a result, the POS system or register may be configured to scan or otherwise acquire the serial number information for purchased products for transmission to the ER system. It would be desirable for both ER and/or POS systems to verify the validity of serial numbers prior to storing them in the ER database, e.g., possibly prompting a clerk to rescan immediately so that potential errors or missing information could be identified prior to transmission to the ER system. The ability to collect and process a wide range of serial numbers without compromising the quality of the data collected is desirable when attempting to successfully implement an ER system. Typically, collection and implementation of serial numbers has required specific programming to ensure that the quality of the data collected is sound.

Thus, it will be appreciated that it would be desirable to develop generalized serial number handling capabilities that support implementation of a variety of serial number formats and also allow for an easy transition to allowing a single scan to identify a product and its serial number. Certain exemplary embodiments of this invention, for example, provide improved techniques for retrieving serial numbers for each Universal Product Code (UPC), which improves the efficiency and accuracy of ER systems and/or other systems in which such information is utilized.

Furthermore, certain exemplary embodiments may determine the correct item serial number structure, even when information regarding the serial number data and/or structure is lacking. Such techniques advantageously promote data integrity by helping to ensure that the desired data is captured correctly, while also reducing (and sometimes even eliminating) the need to obtain detailed information regarding serial number structure and intelligence that sometimes is guarded by producers/manufacturers.

Certain exemplary embodiments of this invention relate to techniques for deciphering product identification numbers (or other numbers) such as product serial numbers through a repetitive process of scanning a known constant such as the UPC number, followed by a variable number such as a product's serial number. Certain exemplary embodiments check serial number against a database containing algorithms to determine if and which algorithm is used to create such serial numbers. Such techniques may be useful for retailers, distributers, manufacturers, product return processing centers, reverse logistics operations, and/or like parties, where product serial number structure and intelligence may be unknown. Certain exemplary embodiments may also use statistical sampling of collected unknown data formats to help derive this and/or other data.

Programmed logic circuitry may include, for example, any suitable combination of hardware, software, firmware, and/or the like. A computer-readable storage medium may include, for example, a disk, CD-ROM, hard drive, and/or the like.

In certain exemplary embodiments, a method for determining a serial number structure when such information is missing or incomplete is provided. A non-transitory computer readable storage location stores at least one serial number mask, with each said serial number mask having an associated length. A serial number for a product is received, with the serial number having an associated length. If the length of the serial number does not equal the lengths of any existing masks stored in the non-transitory computer readable storage location as determined via at least one processor, a new serial number mask is created and the new serial number mask is stored to the non-transitory computer readable storage location via the at least one processor. If the length of the new serial number equals a length of an existing mask stored in the non-transitory computer readable storage location as determined via the at least one processor, the existing mask is altered as minimally as possible to allow the serial number to match the existing mask when the new serial number otherwise would not match the existing mask via the at least one processor. These steps may be repeated until a stable serial number mask is identified.

In certain exemplary embodiments, a method for determining a serial number structure when such information is missing or incomplete is provided. A UPC for a product is received. The UPC for the product is validated in connection with a check digit algorithm, a length validation routine, and/or a database of active UPCs, via at least one processor. A serial number for the product is received. The serial number is checked against the UPC to determine whether the serial number and UPC are the same via the at least one processor. A serial number mask is created for the serial number via the at least one processor. An attempt is made to locate a check digit or check digits within the serial number via the at least one processor. The serial number mask is stored to a storage location. The created serial number mask is iteratively refinable, until a stable serial mask pattern is detected, as further UPCs and further serial numbers are received for further products.

In certain exemplary embodiments, there are provided non-transitory computer readable storage mediums tangibly storing instructions that, when executed by at least one processor of a system, cause these and/or other methods to be executed.

In certain exemplary embodiments, a system for determining a serial number structure when such information is missing or incomplete. A first non-transitory computer readable storage medium comprises at least one known, predefined serial number mask, with each said serial number mask having an associated length. A second non-transitory computer readable storage medium comprises at least one known, predefined check digit algorithm. At least one processor is configured to: (a) receive a serial number for a scanned product, the serial number having an associated length, (b) create a new serial number mask and store the new serial number mask to the first non-transitory computer readable storage location if the length of the serial number does not equal the lengths of any existing masks stored in the first non-transitory computer readable storage location, (c) if the length of the new serial number equals a length of an existing mask stored in the non-transitory computer readable storage location, alter the existing mask as minimally as possible to allow the serial number to match the existing mask when the new serial number otherwise would not match the existing mask, and (d) cause (a)-(c) to be repeated until a stable serial number mask is identified.

The exemplary embodiments, aspect, and advantages described herein may be used in any suitable combination or sub-combination such that it is possible to obtain yet further embodiments of the instant invention.

BRIEF DESCRIPTION OF THE DRAWINGS

Aspects and characteristics of the exemplary illustrative non-limiting implementations will become apparent from the following detailed description of exemplary implementations, when read in view of the accompanying drawings, in which.

DETAILED DESCRIPTION

It will be recognized by those of ordinary skill that modification, extensions and changes to the disclosed exemplary implementations may be made without departing from the scope and spirit of the invention. In short, the present invention is not limited to the particular forms disclosed herein.

Certain exemplary embodiments may determine the correct item serial number structure, even when information regarding the serial number data and/or structure is lacking. Such techniques advantageously promote data integrity by helping to ensure that the desired data is captured correctly, while also reducing (and sometimes even eliminating) the need to obtain detailed information regarding serial number structure and intelligence that sometimes is guarded by producers/manufacturers. Such techniques may be useful for retailers, distributers, manufacturers, product return processing centers, reverse logistics operations, and/or like parties, where product serial number structure and intelligence may be unknown. Statistical sampling of collected unknown data formats may be used to help decipher product identification numbers (or other numbers) such as product serial numbers through a repetitive process of scanning a known constant such as the UPC number, followed by a variable number such as a products serial number. Certain exemplary embodiments check serial number against a database containing algorithms to determine if and which algorithm is used to create such serial numbers.

Figure 1:
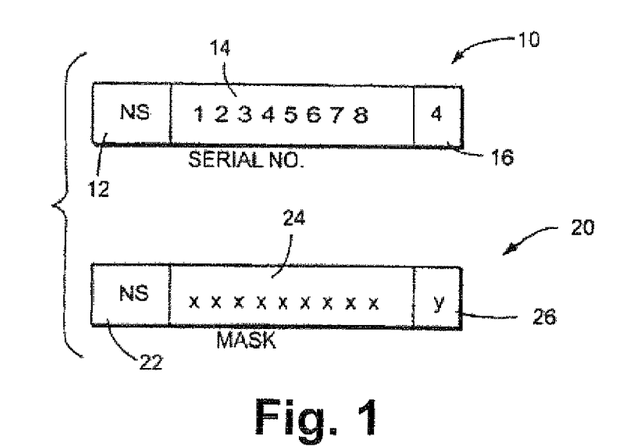
FIG. 1 is an exemplary product serial number and serial number mask.

Generally, a serial number often comprises or consists of three parts: constants, alphanumeric variables, and zero or more check digits or characters. According to manufacturer preferences, the constants and check digit(s) are optional, and only the alphanumeric variables are required. The serial number constants, variables, and check digit(s) need not necessarily maintain positional integrity to be masked according to different implementations. Moreover, typically, serial numbers are not case sensitive. An example of a serial number 10 is shown in FIG. 1. The serial number 10 contains constants 12, alphanumeric variables 14, and a check digit 16. The total length of the serial number is eleven (11) digits.

The constants 12 are a part of the serial number that does not change from serial number to serial number. There may be multiple constants in any given serial number format. For instance, they may be a number, letter, or special character; they may be located in any portion of the serial number; and there may be more than one constant block. Generally, constants can be any value. In some instances, constants may represent special values such as product number, model number, or UPC.

Variables 14 are the portion of the serial number that varies from number to number. In some cases, the variables are alphanumeric, and there may be only one variable section within a serial number format, although multiple variable sections in a single serial number may be supported by the ER systems discussed above. Manufacturers may, however, define other serial number structures with one or more variable portions, and the one or more variable portions each may contain one or more alphanumeric characters. In this context, when multiple variable sections are defined in a serial number, one of the multiple sections can be defined as a primary variable that is used to perform additional checks within the ER system application, including setting a lowest serial number that is valid for registration.

The check digit 16 allows for additional validation when a serial number is captured. The check digit is calculated from one contiguous range of the serial number and may be a single number from 0 to 9, letter from A-Z, special character, etc. The check digit may be located after the range on which it was calculated, or in any suitable location within the serial number in certain structures. Check digit calculation may vary from serial number to serial number, and there are numerous possible ways to calculate a check digit or check digits.

With continued reference to FIG. 1, a serial number mask 20 generically defines attributes of a serial number format by including characters that characterize the serial number format. The generically defined attributes describe a serial number with uppercase and lowercase characters and numbers. Uppercase characters and numbers may describe constant values that have no special meaning in certain exemplary embodiments, whereas lowercase characters may describe variables, check digits, or have other special meanings.

Referring to the serial number 10 shown in FIG. 1, the mask 20 for the example serial number includes constants 22, defined as "NS" in positions 1 and 2, variables 24 defined as lowercase "x" in positions 3-10, and a check digit 26 defined as a lowercase "y" in position 11.

Because serial numbers are not case sensitive, the uppercase "NS" may represent any combinations of lowercase or uppercase "NS" in a serial number (e.g., "NS," "ns," "Ns," or "nS"). In some cases, the constant section(s) of a serial number may represent some special meaning such as a UPC code for a product, a model number for the product, or a vendor specific code for the product. For example, the following constant identifiers may be used to identify these constants:

"a"—when the lower ease "a" is used, it represents a constant portion of the serial number that will be the UPC or G10 code for a given product;

"b"—when the lower case "b" is used, it represents a constant portion of the serial number that is the model number for that product;

"c"—when the lower case "c" is used, it represents a constant portion of the serial number that is used to identify the product that is vendor specific (e.g., something other than a model or UPC number).

The use of format characters allows for additional processing against a serial number such as single scan product identification and serial number collection. As an example, consider the following UCC standard format. For a product with UCC 128 or GS1 128 standard barcode format (01) 00004549663025(21)NS123456784, the mask for this could look like "(01)00004549663025(21)NSxxxxxxxxy." To allow additional flexibility, however, the following mask could also be used to represent the product serial number format "(01)aaaaaaaaaaaaaa(21)NSxxxxxxxxy." In this case, the "a" segment is used to split out the product identification portion of the serial number.

Variables 24 in the mask refer to a fixed length portion of the serial number that may vary in value. This variable portion of the serial number in combination with the constant 22 gives the serial number its uniqueness to a particular product. As shown, the mask character to identify variables is "x." The variable portion of the serial number may be alphanumeric and ascend in value to cause a reduced number of registration value edits. It sometimes may be desirable to set a minimum registration value for product return processing, so that fraudulent returns may be minimized. For example, an older product having a serial number lower than the minimum registration value could be flagged by the system as invalid, thereby preventing product return.

The check digit section 26 of the serial number mask is described using a lower case "y." As noted above, the check digit is a value that is calculated on at least a portion of the variable part of the serial number and possibly the entire serial number.

With respect to UPC and multiple mask definition, the UPC typically is used to identify a product at point of sale. The UPC, however, is not required in using masking. All that is required is that a product has some unique identifier to relate to a mask or masks. Although each product identifier sometimes will have only one mask, it is possible that a given product identifier may have more than one mask. This may be desirable when a product of the same UPC or product identifier has more than one serial number format. Edits using the mask may check for multiple mask definitions to ensure the validity of the serial number being collected. A special mask definition character, for example, such as "i", may be used to maintain a high level of validity checking in special cases such as when engineering revision and/or color codes are built into serial numbers. The mask definition characters may be effective for validity checking (e.g., length of the particular portion of a serial number), while ignoring the contents of that section of the serial number.

Consider the following exemplary serial number: 17563164PR1302C121. The mask for this serial number could be "xxxxxxxxPR1302C121". The last four digits of this number, however, in this example are the engineering code for this product and could change several times a year, requiring the definition of a mask for each unique engineering code. A different way to implement masking in this context may involve using the "i" definition character. In this context, the mask could be "xxxxxxxxPR1302iiii". Thus, one mask may work for all serial numbers, even if the serial number changes according to a modified engineering code. In certain exemplary embodiments, engineering and/or other codes (e.g., batch number, OEM, etc.) may be marked and/or tracked on a per-product and/or per-serial number basis. This information may be further stored and/or processed, e.g., for reporting purposes back to a manufacturer, distributor, or other party.

Of course, it will be appreciated that other serial number formats and serial number masks are known and may be used in connection with different embodiments of this invention. In other words, the present invention is not limited to any particular serial number format or serial number mask.

As alluded to above, a model number may be located within a mask and, as such, certain exemplary embodiments may include techniques for capturing a model number. In certain exemplary embodiments, it is possible to associate sets of start and end points with masks, each to identify for specific information encoded into a serial number. For example, a manufacturer might produce a series of serial numbers for UPC 712345678904 that include a model number and engineering revision codes, and be presented as follows:

HG12345 GH121192
HG12346 GH121193
HG12347AA139855

A mask for this UPC might be: HGxxxxxzzxxxxx. In this example, the model may be encoded in positions 8 through 11. Furthermore, in this example, engineering revision codes might be in positions 12 through 15.

It will be appreciated that associating the model number to the mask, and therefore the UPC, advantageously enables another validity check to be preformed so as to help confirm that the UPC and model number match. This processing may also help revert a UPC to a correct value if a retail point of sale system provided an incorrect value to the ER system (e.g., as a result of a data processing error, data transmission error, improperly scanned item, etc.). In certain exemplary embodiments, engineering revision codes may be extracted and used for product reporting, as such numbers sometimes are useful in analyzing sales and returns trends. Engineering revision codes also may be used in serial number validation if, for example, the manufacturer associated specific engineering codes to UPCs, or associated specific engineering revision codes to specific ranges in the variable portion of the serial number (e.g., positions 3-7).

As alluded to above, retailers, distribution centers, and third party companies, etc., capture information at POS locations, for example. Such information may be obtained for any number of reasons including, for example, to track individual product inventory throughout all or part of the product's lifecycle, for product activation purposes, etc. Such information may include the product's UPC number or an equivalent thereto (e.g., JAN, EAN, Item Number, SKU, etc.) and item serial number or other unique derivative encoded number associated with the individual product. The latter unique number sometimes may be a combination of UPC, serial number and/or other information; a unique external product identifier (such as an RFID, etc.); a key associated with an internal device (e.g., an Integrated Circuit) built into the product (such as a television or other electronic product); etc.

Unfortunately, however, manufacturers often do not follow any standardized serial number formats when generating and applying serial number labels to their products. Most serial numbers among different brands vary in the number of characters, combination of alphanumeric or other special characters, and check-digit algorithms they may incorporate. To make certain the desired/correct information is captured and ensure data integrity, the producer/manufacture of such items currently must be consulted to determine the proper serial number structure and intelligence that it has incorporated in to its serial number and if an algorithm is utilized in determining a cheek-digit. Once the information is ascertained, a system can be programmed, hard-coded or incorporated in to a serial number mask (see, for example, U.S. Pat. No. 6,947, 941), to scrutinize and ensure accuracy of the serial number data entered.

Obtaining this information from a manufacturer may not always be feasible or possible. Indeed, obtaining the information may be more complicated when the manufacturer is a third party OEM, where there is no relationship or a strained relationship with the manufacturer. In such cases, the assignee of the instant application has determined that manufacturers may not be forthcoming with such information. Further complications arise because a product occasionally may have serial numbers of varying formats due to separate serialization standards at different manufacturing facilities. As a result, there currently is a need in the art to reduce errors when capturing such information, even when detailed format information is unknown.

Certain exemplary embodiments of this invention provide techniques for deciphering identification numbers such as product serial numbers through a repetitive process of scanning a known constant such as the UPC number, followed by a variable number such as a products serial number. The technique produces a list of serial number masks for each distinct pattern that arises. This derived information may help provide for dynamic data validation, e.g., to determine the correct item serial number structure and intelligence—sometimes even without the benefit of the producer/manufacturer of such items divulging the serial number data intelligence and/or structure.

Figure 2:
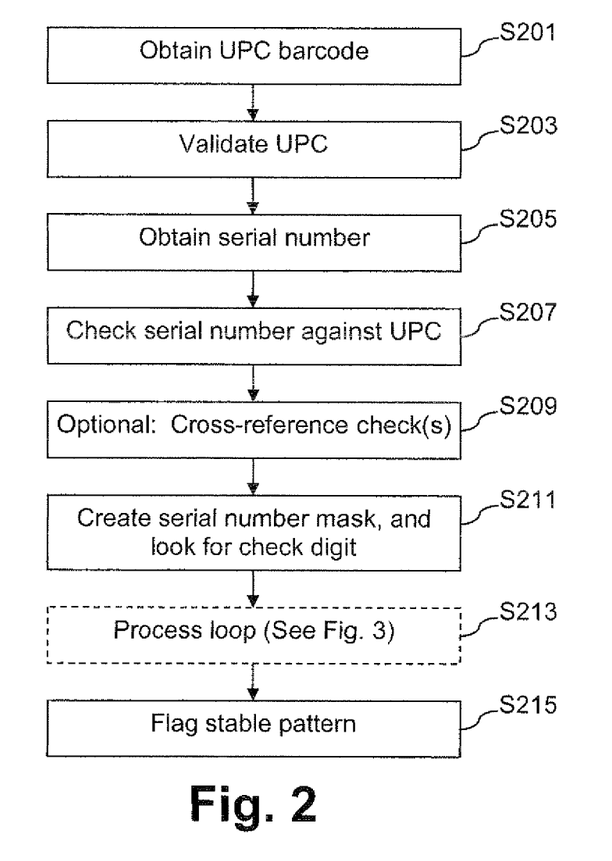
FIG. 2 is a flowchart showing an illustrative process for determining a likely serial number mask in accordance with an exemplary embodiment.

In this regard, FIG. 2 is a flowchart showing an illustrative process for determining a likely serial number mask in accordance with an exemplary embodiment. In step S201, a UPC (or the like) is obtained, e.g., by read, scanning, or otherwise providing a barcode or other tag. In step S203, the UPC is validated. For instance, the system may check and validate that a correct UPC was input using the standard UPC check digit algorithm, length validation, etc. Optionally, a known UPC database of active UPCs may be consulted as a part of this process. In step S205, an item serial number may be provided. The serial number may be checked in step S207 to ensure that it is not a UPC number using UPC validation techniques. Again, a UPC database of active UPCs may be consulted. In one or more steps not shown, a warning message may be produced if a match is found. However, some manufacturers may produce serial numbers that randomly conform to the UPC check digit algorithm, so it may be desirable to continue with the process even though a warning is raised. In step S207, optional cross-reference checks may be performed. For instance, in certain exemplary embodiments, the entered number may be checked against a table of known Model Numbers that correlate with the input UPC number, the entered number may be checked against a table of known retail item number (e.g., SKUs or Stock Keeping Units) that correlate with the input UPC number, etc.

In step S211, a serial number mask may be created that is as specific as possible (e.g., including all constants). See, for example, U.S. Pat. No. 6,947,941 for example details as to how to create a serial number mask. This may include checking each possible alphanumeric character in the scanned serial number with all supported or known, predefined check digit algorithms. Each alphanumeric digit in the input serial number may be checked as a serial number check digit. The range of digits used in the calculation may be the longest set of contiguous integers preceding the digit being validated. This process may proceed from left to right and, if more than one digit matches an algorithm, then the digit that has had the largest range of values used in its calculation may be kept whereas the rest may remain either alphanumeric constants or alphanumeric place holders in the mask. The process then proceeds to step S213, which is a process loop that helps to iteratively refine the mask. The step S213 process loop is described in greater detail in connection with FIG. 3.

Figure 3:
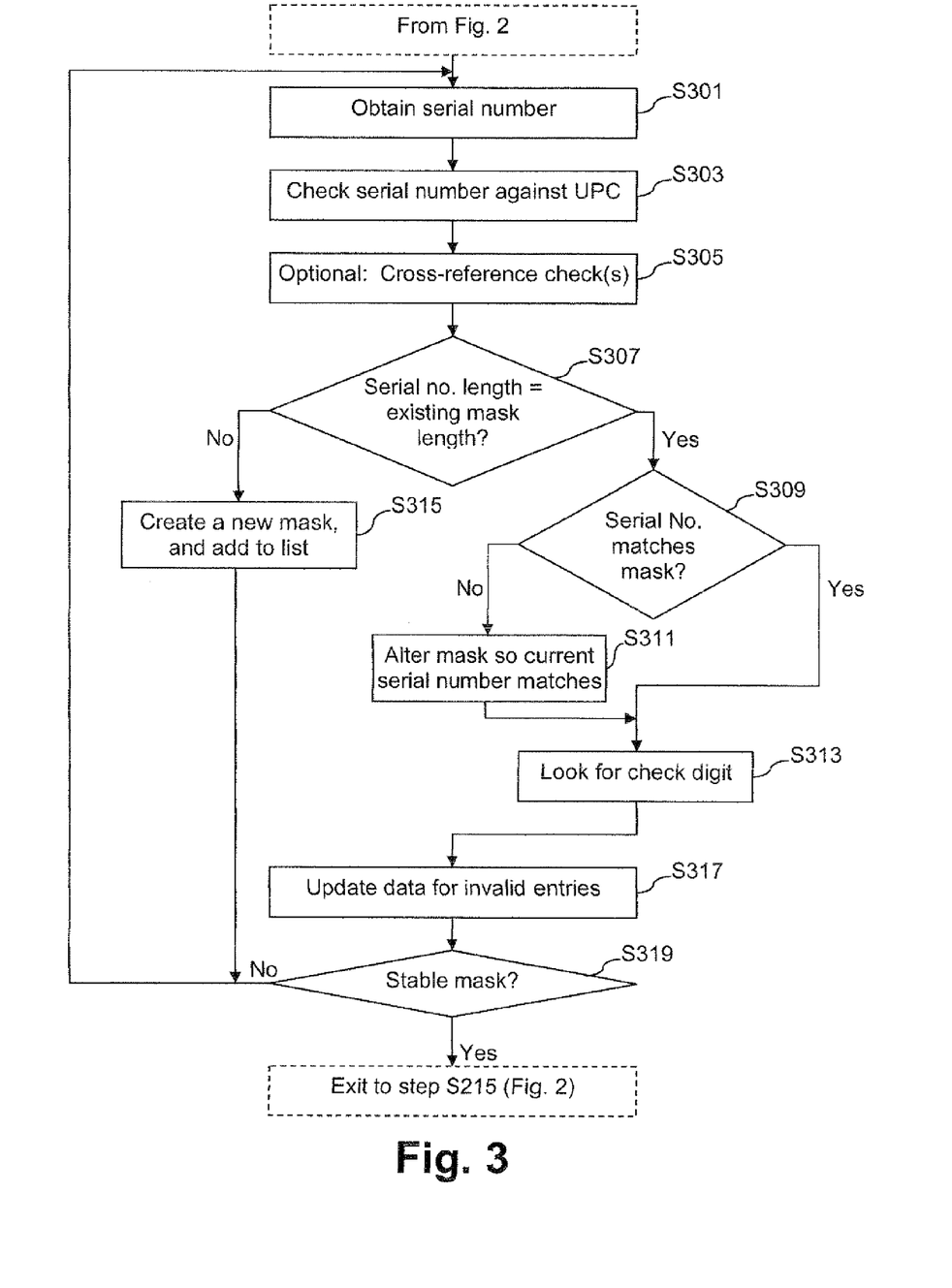
FIG. 3 is a flowchart showing an illustrative processing loop to be used in connection with the FIG. 2 example process in accordance with an exemplary embodiment.

Referring now more particularly to FIG. 3, another serial number is scanned in step S301. Similar to step S207, the serial number is checked to ensure that it is not a UPC number using UPC validation techniques optionally including, for example, consultation of a UPC database of active UPCs. In step S305, optional cross-reference checks may be performed. For instance, the entered number may be checked against a table of known Model Numbers that correlate with the input UPC number, the entered number may be checked against a table of known retail item number (e.g., SKUs) that correlate with the entered UPC number, etc.

The serial number length is compared to length(s) of the existing mask(s) in S307. If there is a match, a determination is made in step S309 as to whether the serial number matches the mask. If there is no match, then the mask is altered (e.g., as minimally as possible) to allow the current serial number to match in step S311. In certain exemplary embodiments, regardless of whether there is an alteration or not, a search for possible check digits in the serial number may be performed in step S313. This process may be similar to that described above in connection with step S211. In certain exemplary embodiments, the check digit search of step S313 may only be performed in cases where alterations are made to the mask (e.g., when the result of step S309 is "no" and an alteration is performed in step S311). It will be appreciated that step S313 may cause one or more prior check digits to become invalid. This may indicate, for example, that the serial number may not have a check digit at all.

If the length of the serial number is not the same as an existing mask (e.g., "no" in step S307), then a new mask may be created in step S315. This process of step S315 may be similar to the step S211 process, and the newly created mask may be added to the list of known masks.

In certain exemplary embodiments, a list of check digit ranges, modular-arithmetic values, and check digit place holders may be saved for each invalid possibility so that the alteration of the mask in step S311 may proceed more efficiently, e.g., without having to re-check check-digit algorithms that are not valid for previously scanned serial numbers. This approach is shown as step S317 in FIG. 3. Although the placement of step S317 is shown following the mask alteration in step S311 and after creation of a new mask in step S315, it will be appreciated that this step S317 may be provided elsewhere in the process. Differently stated, this process step (like many of the other process steps) may be moved, duplicated, and/or rendered optional in different exemplary embodiments of this invention. In certain exemplary embodiments, following step S315, the process may return to step S301.

In any event, the FIG. 3 loop may be repeated until a satisfactory and stable set of serial number masks have been detected/established, and certain decisive factors are found suggesting the serial number submitted is indeed a serial number. In that regard, if a stable mask is not found in step S319, the process may return to step S301 at the top of FIG. 3. If, however, a stable mask is found in step S319, the process may exit to step S215 in FIG. 2. In step S215, once a satisfactory and stable pattern is discovered, the list of serial masks may be marked for further review. They may then be utilized to validate and screen further serial number entries for this particular product UPC. A stable pattern may be identified, for example, once a predetermined number (e.g., 100, 1,000, 10,000, etc.) or percentage (e.g., 50+%, 80%, 90%, 95%, 99%, etc.) of serial numbers pass through the detection loop without requiring a change to a particular candidate mask for the product. In certain exemplary embodiments, the stable pattern may be flagged for possible manual review once a stable pattern is suspected, e.g., for possible certification of the mask. In certain exemplary embodiments, flagged patterns may be transmitted in real-time or in batch (e.g., at predetermined time intervals, upon a request, etc.) to appropriate personnel (e.g., at the ER system, the manufacturer, the retailer, etc.) for confirmation and/or compliance purposes.

It will be appreciated that this process may be performed in real-time (e.g., at a PUS location, when products are scanned in a warehouse, when data is fed to an ER system, etc.), ahead of time (e.g., in a certification process, possibly in connection with a batch of information provided by a manufacturer, etc.), etc.

The table below shows an example of how the illustrative process shown in the FIGS. 2 and 3 flowcharts may be used to iteratively search for a mask. More particularly, serial numbers are entered, an initial mask is defined, and the initial mask is iteratively refined so that it is made more and more generic.

| Serial Number | Mask | Algorithm |
|---|---|---|
| NS123456784 | NS123456784 | |
| NS123456777 | NS1234567xy | 03, 10, R, 3, O, N, 10, L |
| NS588456770 | NSxxx4567xy | 03, 10, R, 3, O, N, 10, L |
| NS442972316 | NSxxxxxxxxy | 03, 10, R, 3, O, N, 10, L |
| NS442972315 | NSxxxxxxxxx | N/A |

The following table provides one example check digital parameter legend, e.g., that may be used to interpret the algorithm column in the table provided above.

| Field Number | Field Definition |
|---|---|
| 1 | Start Position: This value defines the first position in the serial number to be used in the check digit calculation. Applied after drop characters have been removed. Value Range: 1 to 99. |
| 2 | End Position: This value defines the last position in the serial number to be used in the check digit calculation. Applied after drop characters have been removed. Value Range: 1 to 99 |
| 3 | Directional Operator: This value defines the odd and even characters within a serial number. Value Range: R-L, R, L-R, L<br>R-L: Right-to-Left. Defines the last character of a serial number, excluding the check digit to be odd.<br>R: Same as "R-L". This value is used in the compressed algorithm.<br>L-R: Left-to-Right. Defines the first character of a serial number, excluding the check digit to be odd.<br>L: Same as "L-R". This value is used in the compressed algorithm. |
| 4 | Multiplier Value: This value will be multiplied against each value, either even or odd, as defined by argument 5 in the algorithm, to come up with a sum that is used in the modulo calculation. Value Range: 0 to 9 |
| 5 | Multiplier Identifier: This value identifies whether the odd or even characters in a serial number will have the multiplier value applied. Value Range: O, E<br>O: Specifies odd characters shall have the multiplier value applied.<br>E: Specifies even characters shall have the multiplier value applied. |
| 6 | Reduction Identifier: When multiplying the positional number by the multiplier value, there are at least two ways that the calculation may be performed. First, the sum may be calculated by adding the result of each position multiplied by the multiplier value. Second, the sum may be calculated by adding the reduced result of each position multiplied by the multiplier value. Values are "reduced to a single digit", as follows. If a positional value multiplied by the multiplier value is greater |

| Field Number | Field Definition |
|---|---|
| | than or equal to 10, then each digit is added together to form a new reduced value. This step may be repeated once more if the previous result also formed a number greater than or equal to 10.<br>Value Range: Y, N<br>Y: Specifies that reducing should take place.<br>N: Specifies that reducing should not take place. |
| 7 | Modulo Value: The sum of the positional values, including application of the multiplier, is divided by this value, and the resulting remainder of that calculation is then used in further calculations specified by the Check Digit Operator. This remainder will be referred to as the "modulo calculation result."<br>Note: This is an optional argument. The default value is 10.<br>Value Range: 1 to 99. |
| 8 | Check Digit Operator: This operator is used to identify the method of reducing the modulo calculation result (if necessary) to produce the final check digit.<br>Note: This is an optional argument. The default value is 'L'.<br>Valid Range: L, Z, S<br>L: If the Check Digit Operator is 'L' then the final check digit is the last digit of the following calculation: (Modulo value − modulo calculation result).<br>Z: If the Check Digit Operator is 'Z' and the result of the following calculation: (Modulo value − modulo calculation result) is equal to the Modulo Value, then the final check digit result is 0.<br>If the Check Digit Operator is 'Z' and the result of the following calculation: (Modulo value − modulo calculation result) is NOT equal to the Modulo Value, then the final check digit is the last digit of (Modulo value − modulo calculation result).<br>S: If the Check Digit Operator is 'S' then the final check digit is the last digit of the modulo calculation result. |

Figure 4:
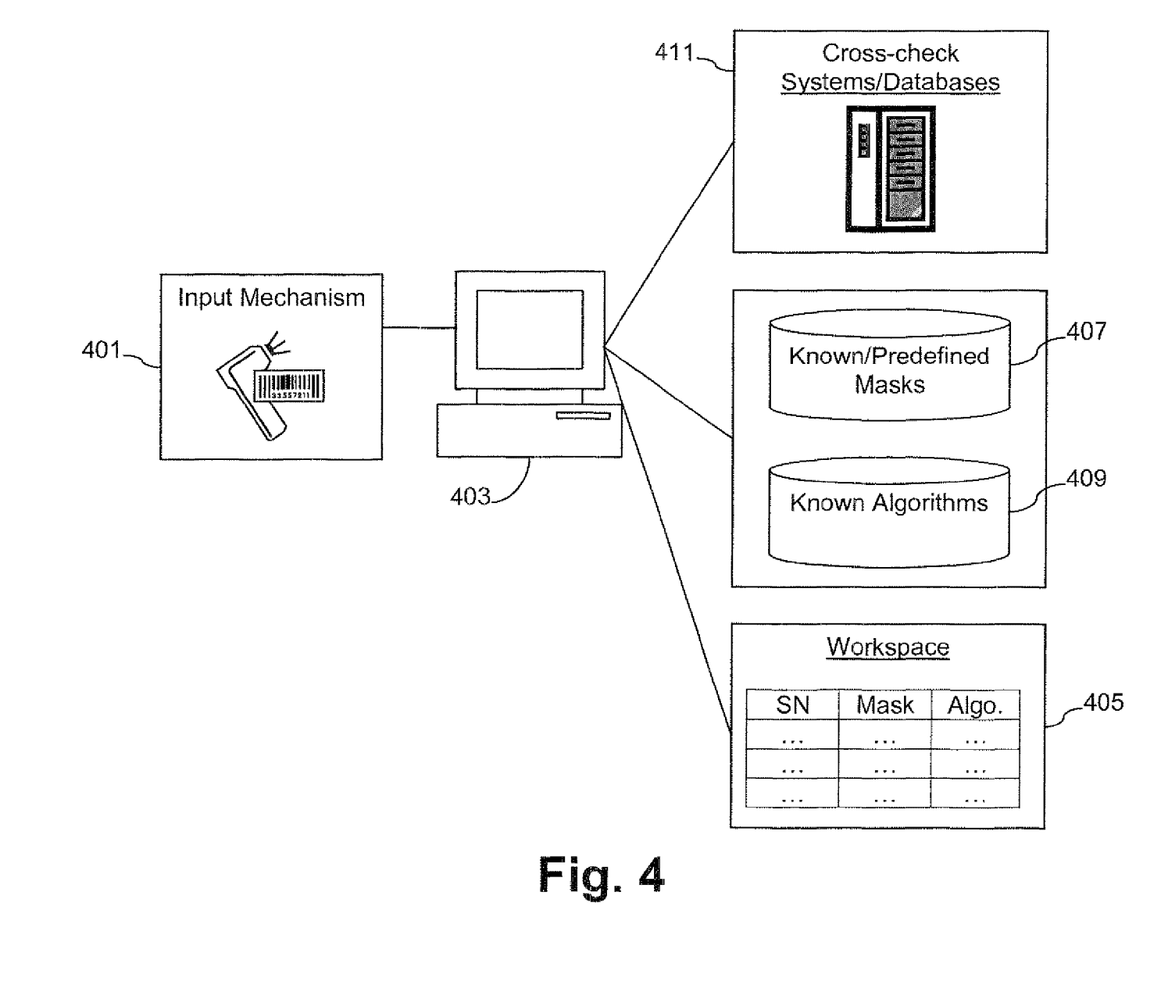
FIG. 4 is a simplified schematic view of an illustrative architecture for determining a likely serial number mask in accordance with an exemplary embodiment.

FIG. 4 is a simplified schematic view of an illustrative architecture for determining a likely serial number mask in accordance with an exemplary embodiment. An input mechanism (e.g., barcode scanner, RFID reader, or the like) is connected to a computer terminal 403. The computer terminal 403 may be provided at a POS or other suitable location. The computer terminal 403 also may be able to setup a workspace 405 so as to at least temporarily store serial number, mask, and algorithm information (e.g., as shown in the table above), as it executes using a processor instructions stored on a tangible computer readable storage medium that correspond, for example, to the process steps described above and in connection with FIGS. 2-3. As alluded to above, a database of known or predefined masks 407 and a database of known algorithms 409 may be accessible by the computer terminal 403. These databases 407 and 409 may be stored at local or remote locations (e.g., a network location) accessible by the computer terminal 403. It will be appreciated that multiple terminals 403 may have access to the databases 407 and 409, e.g., over a network location. In any event, referring once again to FIG. 4, the terminal 403 also may have access to cross-check systems and/or databases 411. As before, these systems/databases may be accessible via a network connection.

Certain exemplary embodiments may be thought of as being global. This may mean that the ER database may function across disparate systems throughout all or substantially all of an item's or a product's lifecycle (e.g., from manufacture to shipment to sale to return, etc.). The various system components may be located around the world and the system may be said to be global in this sense, as well.

Although certain exemplary embodiments have been described as relating to serial numbers and serial number masks, it will be appreciated that other data structures may be used. Furthermore, although many serial numbers contain constants, a UPC, and check digit, other information may be stored in place of, or in addition to, such information. The techniques described herein may be used to derive these structures, as well. In addition, although certain example formats and example algorithms have been described herein, different exemplary embodiments may be made to function with different formats and different algorithms. It also will be appreciated that the exemplary embodiments described herein may be made to function with masks where some data is known and some data is unknown, e.g., where manufacturers or the like make certain information known while protecting other types of information. Furthermore, as noted above, the techniques described herein also may be used in connection with RFID tags. See, for example, U.S. application Ser. No. 10/983,337, the entire contents of which are hereby incorporated herein by reference.

Furthermore, although certain exemplary embodiments have been described in relation to serial numbers and serial number masks, the exemplary techniques described herein may be applied to other types of masks. In certain exemplary embodiments, it may be possible to distinguish between different kinds of masks (e.g., serial number masks, shipping or tracking code masks, UPCs, SKUs, etc.). In certain instances, it may be desirable to identify different masks to determine, for example, whether the wrong type of information has been scanned. An indication may be made available to a clerk at a POS location for immediate correction, stored and/or sent to a manufacturer/logistics provider/retailer/other party to indicate that further training is necessary or desirable, to suggest that packaging should be changed (e.g., to reduce perceived confusion and improve the quality of scans), etc. Such information may be stored in the ER database (e.g., when it is product-related data) or in another separate database in different embodiments of this invention (e.g., when it includes more personal information). Capturing data in this way may help to improve the overall integrity of the data captured, as improperly scanned codes may be received and rejected, and a replacement prompt may be generated, so as to help obtain better data in the first instance. The ability to help ensure that the right data is obtained at the right time may also in certain instances help reduce fraud related to the scanning of knowingly improper data that is used to falsely populate an ER, crime prevention, watchlist, or other database.

Although certain exemplary embodiments have been described as relating to POS systems, it will be appreciated that the exemplary embodiments may be implemented at other locations. For example, logistics provides, retailers, wholesalers, auction houses (online or conventional), pawnshops, and/or the like, also may find the techniques described herein useful. The same also holds true for law enforcement and/or other personnel. See, for example, U.S. application Ser. No. 12/314,150 for example details concerning law enforcement operations and U.S. application Ser. No. 11/892, 415 for example details concerning auction houses and/or pawnshops. The entire contents of these applications are hereby incorporated herein by reference.

While the invention has been described in connection with exemplary illustrative non-limiting implementations, it is to be understood that the invention is not to be limited to the disclosed implementations, but on the contrary, is intended to cover various modifications and equivalent arrangements included within the spirit and scope of the appended claims.

What is claimed is:

1. A method for determining a serial number structure when such information is missing or incomplete, the method comprising:
   (a) providing a non-transitory computer readable storage location storing at least one serial number mask, each said serial number mask having an associated length;
   (b) receiving a serial number for a product, the serial number having an associated length;
   (c) creating a new serial number mask and storing the new serial number mask to the non-transitory computer readable storage location via at least one processor when the length of the serial number does not equal the lengths of any existing masks stored in the non-transitory computer readable storage location as determined via the at least one processor;
   (d) altering, via the at least one processor, the existing mask as minimally as possible to allow the serial number to match the existing mask when the new serial number otherwise would not match the existing mask, when the length of the new serial number equals a length of an existing mask stored in the non-transitory computer readable storage location as determined via the at least one processor; and
   (e) repeating (b)-(d) until a stable serial number mask is identified via the at least one processor.

2. The method of claim 1, wherein the stable serial number mask is identified when a predetermined number or percentage of matches are made without requiring any changes to the corresponding mask.

3. The method of claim 2, further comprising flagging the stable serial number mask for manual follow-up.

4. The method of claim 1, further comprising following (b), searching for one or more possible check digits in the serial number.

5. The method of claim 4, wherein the searching is performed each time an existing mask is altered.

6. The method of claim 4, further comprising validating one or more characters to determine whether the one or more characters is/are a check digit(s).

7. The method of claim 6, further comprising running all known predefined check digit algorithms against a range of one or more characters in the serial number in validating the one or more characters.

8. The method of claim 7, wherein the range of characters to be used in connection with the check digit algorithms is the longest set of contiguous characters preceding the digit(s) being validated as possible check digit(s).

9. The method of claim 8, further comprising proceeding validating the digit(s) from left to right and, if more than one digit or group of digits matches a run algorithm, then recording the digit or group of digits that has had the largest range of values used in its calculation as the check digit(s), and designating any remaining characters as either alphanumeric constants or alphanumeric place holders in the mask.

10. A system for determining a serial number structure when such information is missing or incomplete, comprising:
    a first non-transitory computer readable storage medium comprising at least one known, predefined serial number mask, each said serial number mask having an associated length;
    a second non-transitory computer readable storage medium comprising at least one known, predefined check digit algorithm; and
    at least one processor configured to:
       (a) receive a serial number for a scanned product, the serial number having an associated length,
       (b) create a new serial number mask and store the new serial number mask to the first non-transitory computer readable storage medium when the length of the serial number does not equal the lengths of any existing masks stored in the first non-transitory computer readable storage medium,
       (c) when the length of the new serial number equals a length of an existing mask stored in the first non-transitory computer readable storage medium, alter the existing mask as minimally as possible to allow the serial number to match the existing mask when the new serial number otherwise would not match the existing mask, and
       (d) cause (a)-(c) to be repeated until a stable serial number mask is identified.

11. The system of claim 10, wherein the at least one processor is further configured to identify the stable serial number mask when a predetermined number or percentage of matches are made without requiring any changes to the corresponding mask.

12. The system of claim 11, wherein the at least one processor is further configured to flag the stable serial number mask for manual follow-up.

13. The system of claim 10, wherein the at least one processor is further configured to search for one or more possible check digits in the serial number each time a serial number for a scanned product is received.

14. The system of claim 13, wherein the search is performed each time an existing mask is altered.

15. The system of claim 13, wherein the at least one processor is further configured to validate one or more characters to determine whether the one or more characters is/are a check digit(s).

16. The system of claim 15, wherein the at least one processor is further configured to run all known predefined check digit algorithms stored in the second non-transitory computer readable storage medium against a range of one or more characters in the serial number in validating the one or more characters.

17. The system of claim 16, wherein the range of characters to be used in connection with the check digit algorithms is the longest set of contiguous characters preceding the digit(s) being validated as possible check digit(s).

18. The system of claim 17, wherein the at least one processor is further configured to proceed validating the digit(s) from left to right and, if more than one digit or group of digits matches a run algorithm, then record the digit or group of digits that has had the largest range of values used in its calculation as the check digit(s), and designate any remaining characters as either alphanumeric constants or alphanumeric place holders in the mask.

19. The system of claim 10, wherein each said serial number is received from a point-of-sale (POS) system.

20. The system of claim 10, wherein the at least one processor is further configured to receiving a UPC for a product and validate the UPC for the product in connection with a check digit algorithm, a length validation routine, and/or a database of active UPCs.

* * * * *